United States Patent [19]

Carreno et al.

[11] Patent Number: 5,318,404
[45] Date of Patent: Jun. 7, 1994

[54] STEAM TRANSFER ARRANGEMENT FOR TURBINE BUCKET COOLING

[75] Inventors: Diether E. Carreno, Schenectady; Albert Myers, Amsterdam, both of N.Y.

[73] Assignee: General Electric Company, Schenectady, N.Y.

[21] Appl. No.: 996,937

[22] Filed: Dec. 30, 1992

[51] Int. Cl.5 ............................................. F01D 5/08
[52] U.S. Cl. ................................. 416/96 R; 416/95; 416/220 R
[58] Field of Search .................. 415/115, 116; 416/95, 416/96, 97 R, 220 R

[56] References Cited

U.S. PATENT DOCUMENTS

| | | | |
|---|---|---|---|
| 2,421,855 | 6/1947 | Soderberg | 416/220 |
| 2,931,623 | 4/1960 | Hyde | 416/95 |
| 4,400,137 | 8/1983 | Miller et al. | 416/220 R |
| 4,505,640 | 3/1985 | Hsing et al. | 416/95 |
| 4,531,889 | 7/1985 | Grondahl | 416/96 R |

FOREIGN PATENT DOCUMENTS

| | | | |
|---|---|---|---|
| 0562661 | 9/1958 | Canada | 416/97 |
| 2745892 | 4/1979 | Fed. Rep. of Germany | 416/95 |
| 2070147 | 10/1981 | United Kingdom | 416/96 |

*Primary Examiner*—Edward K. Look
*Assistant Examiner*—Mark Sgantzos
*Attorney, Agent, or Firm*—Nixon & Vanderhye

[57] ABSTRACT

The steam transfer arrangement includes dovetail connections between a turbine bucket 14 and rotor wheel 12 wherein a steam supply passage 20 in the rotor wheel registers with a steam return passageway 28 in the bucket and a steam return passageway 30 in the bucket lies in registry with a steam return passage in the wheel. At the interface of the dovetail connection, each registering passage and passageway includes a sleeve 50, 52 disposed in an enlarged recess 54, 56, the sleeves having annular spherical sealing surfaces for engagement with annular spherical seats on the turbine bucket. The sleeves are compressible radially relative to the bucket to enable the bucket to be secured to the wheel and expand radially outwardly to ensure sealing fit between the sealing surfaces and seats.

16 Claims, 3 Drawing Sheets

5,318,404

STEAM TRANSFER ARRANGEMENT FOR TURBINE BUCKET COOLING

TECHNICAL FIELD

The present invention relates to steam cooling of high efficiency, high output gas turbines for lowering the operating temperature of the gas path parts and particularly to an arrangement for transferring the steam from the turbine rotor or wheel into the turbine buckets for cooling the buckets and return to the wheel.

BACKGROUND

The buckets of gas turbines are typically cooled by air cooling systems. Compressor discharge air is brought into the wheel and channelled into the dovetail slots between the wheel and turbine buckets through drilled holes. The buckets themselves have one or more air passages for flowing the cooling air along the bucket. While the matching slot arrangement of the wheel and buckets has been effective for the purposes for which they were designed, they do have the disadvantage of affording leakage paths which are detrimental to the performance of the gas turbine. Many modifications to various designs for transferring cooling air from the rotor wheel to the buckets have been proposed in the past. However, the disadvantages have mainly been accepted and the designs have taken into consideration the relatively low pressure and leakages of those cooling air flow paths.

In gas turbines, particularly those operating at very high temperatures, it has now become desirable to employ steam as the cooling medium. However, steam pressures are multiples of those used in air cooling systems. Moreover, leakage paths must be avoided, or at least controlled to an absolute minimum level. In short, the transfer of the steam between the rotor wheel and the buckets must occur with a minimum loss of fluid to the surrounding environment, while maintaining a high degree of reliability to deliver required pressures and flow to the bucket. Additionally, steam used to cool the buckets must be returned to the source, with minimum loss to the closed-cycle cooling system. Thus, two different transfer points per bucket at different pressures and temperatures are required.

DISCLOSURE OF THE INVENTION

In accordance with the present invention, there is provided a steam supply passage and a steam return passage opening into the slot of a turbine wheel, and in which slot the base or root of a turbine bucket is secured. Typically, the slots and bucket roots are complementary, preferably dovetail, shaped with the dovetails extending in an axial direction whereby the turbine buckets can be axially displaced along the slot into proper secured position. The root of the turbine bucket has a steam inlet for receiving steam from the turbine wheel steam supply passage and a steam outlet for returning steam from the bucket to the turbine wheel return passage. To provide an effective seal at the interface of the turbine bucket and turbine wheel, there is provided in a first embodiment hereof a pair of seals, each comprising a generally radially extending sleeve having an annular sealing surface, the sleeves preferably being mounted in the turbine wheel in communication with the respective supply and return passages, and with their sealing surfaces projecting into the turbine wheel slot. The steam inlet and outlet of the turbine bucket have corresponding complementary-shaped annular seats for engaging the respective sealing surfaces of the seals when the turbine buckets are finally secured to the turbine wheel. The sleeves are movable in a radial direction. Preferably, the sleeves are spring-biased such that the sealing surfaces project radially outwardly into the slot and are movable radially inwardly against the bias of the springs. Thus, upon axial displacement of a turbine bucket along a wheel slot toward final securement therein, the sealing surfaces may be displaced radially inwardly and spring back into sealing engagement with the respective seats on the turbine bucket in final sealing engagement therewith. It will be appreciated that the sleeve may be disposed on the bucket and the seat on the wheel, although the previously described arrangement is preferred.

Further, in the preferred embodiment, each sealing sleeve is corrugated to provide the spring force necessary to bias its sealing surface in a radially outer direction. Moreover, for purposes of facilitating securement of the buckets and the wheels, the sleeves are movable in a direction parallel to the rotor axis, thus enabling the spherical annular sealing surfaces to be positioned directly in registry with the respective annular spherical seats carried by the bucket root for proper sealing and to account for possible misalignment of the buckets and wheel dovetail transfer passages.

Additionally, the buckets typically will have a plurality of steam cooling passageways and steam return passageways, the steam cooling passageways communicating with the return passageways adjacent the tip of the turbine bucket. To accommodate those plural passageways, the inlet and outlet to and from the bucket include respective inlet and outlet plenums. Thus, the inlet plenum is in communication with the steam inlet of the bucket and the steam supply passageways, while the outlet plenum is in communication with the steam return passageways and the steam outlet of the bucket. Each plenum has an opening through the bucket root end face and each bucket passageway has an opening through the radial inner face of the bucket root. These openings are capped by removable plugs to enable servicing, e.g., cleaning the steam transfer passages.

In another embodiment of the present invention, each bucket root is provided with an axially extending borehole. A shaft extends into the borehole and has a central diametrically enlarged portion, with diametrically reduced portions on opposite sides of the central portion defining respective annular steam supply and steam return plenums. The shaft is bolted in place with end sealing gaskets to prevent leakage from the plenums about the shaft ends. The sealing nuts and end sealing gaskets provide a redundant independent sealing feature, in addition to allowing the buckets to be locked in place independently of one another. It also enables inspection and cleaning of the internal bucket plenum from the outside.

In a still further embodiment of the present invention, the bucket and wheel dovetails may be extended axially outwardly on opposite sides of the turbine stage. A transfer sleeve may be press-fitted into radially drilled holes of the wheel and bucket dovetails after the bucket has been inserted into the wheel slot. A pin is used to lock the transfer sleeve in place. The transfer sleeve has an internal passage in communication with the steam supply passage of the turbine wheel for flowing steam into the bucket plenum. The sleeves serve to axially lock the bucket and wheel one to the other. While the steam supply sleeve is solid, the return sleeve has an axial flexibility to enable the bucket's axial thermal expansion to occur relative to the fixed entrance sleeve. Thus, the return sleeve is provided with a flexible corrugated shape at the interface between the bucket and wheel dovetail for purposes of accepting differential motion between the parts. The high strength, high ductility and high thermal expansion of the transfer sleeves enable relative axial motion and increased sealing effectiveness through differential thermal growth between the sleeve and surrounding walls, while enabling communication of the steam between the turbine bucket and wheel.

In a preferred embodiment according to the present invention, there is provided a steam transfer apparatus comprising a turbine wheel having a rotary axis, a slot, a steam supply passage and a steam return passage opening into the slot. A turbine bucket has a base engageable in the slot and extending generally radially of the wheel, with a steam inlet carried by the turbine bucket base for receiving steam from the turbine wheel steam supply passage, a steam passageway in communication with the steam inlet and extending along the bucket for steam cooling the bucket, and a steam outlet carried by the turbine bucket base in communication with the passageway in the bucket for flowing steam from the bucket to the turbine wheel steam return passage. A pair of seals is provided between the steam supply passage and the steam inlet and the steam return passage and the outlet, respectively, at least one of the seals including a sleeve carried by one of the wheel and the bucket and having a sealing surface movable in a generally radial direction for sealing engagement with a seat carried by the other of the wheel and the bucket and means for biasing the sealing surface for movement in the generally radial direction into sealing engagement with the seat.

In a further preferred embodiment according to the present invention, there is provided steam transfer apparatus comprising a turbine wheel having a rotary axis, a slot, and a steam supply passage, a steam return passage opening into the slot and a turbine bucket having a base engageable in the slot and extending generally radially of the wheel. A steam inlet is carried by the turbine bucket base for receiving steam from the turbine wheel steam supply passage, a steam passageway in communication with the steam inlet and extending along the bucket for steam cooling the bucket and a steam outlet carried by the turbine bucket base in communication with the passageway in the bucket for cooling the bucket for flowing steam from the bucket to the turbine wheel steam return passage. A pair of sleeves is provided between the steam supply passage and the inlet and the steam return passage and the outlet, respectively, at least one of the sleeves extending across an interface between the bucket base and the wheel slot, one sleeve having an internal passage in communication with one of (i) the bucket inlet and the steam supply passage and (ii) the bucket outlet and the steam return passage.

Accordingly, it is a primary object of the present invention to provide a novel and improved steam transfer arrangement for turbine bucket cooling in a gas turbine wherein leakage of the high pressure cooling steam from a closed-cycle steam system is minimized, maximum accessibility to inlet and outlet ports for ease of assembly is provided, disassembly and field maintenance is maximized, enabling servicing of transfer point hardware and additional bucket axial locking is provided.

BEST MODE FOR CARRYING OUT THE INVENTION

Reference will now be made in detail to a present preferred embodiment of the invention, an example of which is illustrated in the accompanying drawings.

Figure 2:
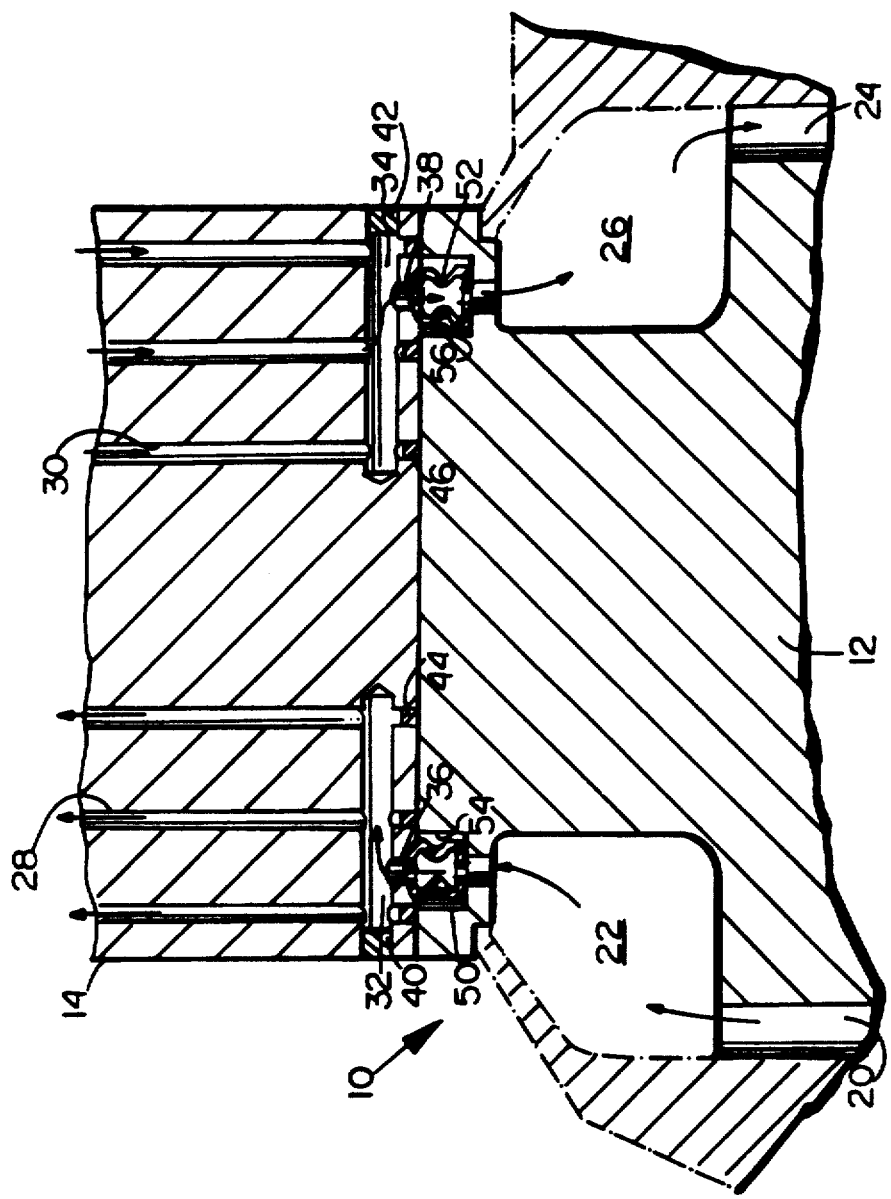
FIG. 2 is a fragmentary longitudinal cross-sectional view thereof taken about on line 2—2 in FIG. 1 illustrating a steam transfer arrangement and seals therefor according to the present invention.
Figure 1:
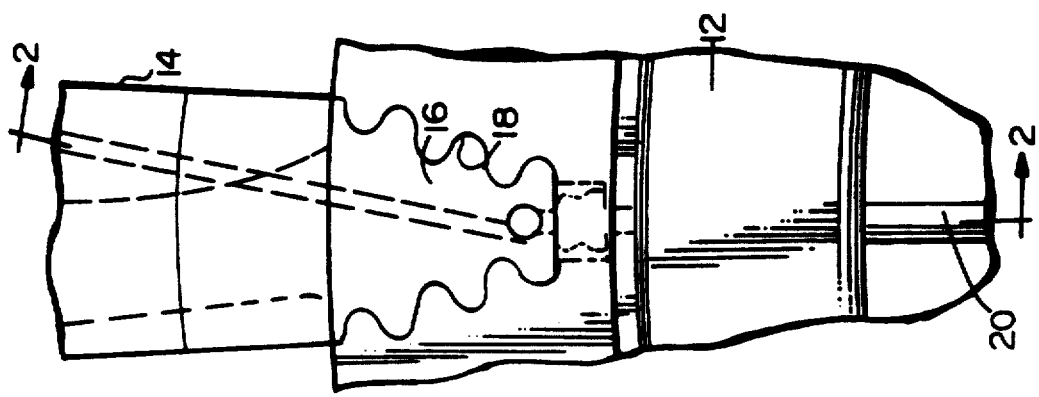
FIG. 1 is a fragmentary axial view of a turbine wheel and turbine bucket illustrating the dovetail connection therebetween and certain of the steam transfer passages hereof.

Referring now to the embodiment hereof illustrated in FIGS. 1 and 2, there is illustrated a steam transfer arrangement, generally designated 10, for transferring steam between a turbine wheel or rotor 12 and turbine bucket, one of which is designated 14. As best illustrated in FIG. 1, the root or base of turbine bucket 14 includes a dovetail 16 for reception in a complementary dovetailed slot 18 formed in the rotor wheel 12. It will be appreciated that the turbine bucket is slidable in an axial direction in order to install the bucket on the wheel 12 into a finally secured position, as illustrated in FIG. 2.

The rotor wheel 12 includes a steam supply passage 20 including a rotor wheel cavity 22 and a steam return passage 24, including a rotor wheel cavity 26. Bucket 14 includes one or more steam passageways 28 for receiving steam from the steam supply passage 20 and one or more steam return passages 30 for returning steam from the bucket to the steam return passage 24 in rotor wheel 12. It will be appreciated that the steam passageways 28 extend to the tip of the bucket 14 and lie in communication adjacent the tip with the return passageways 30. In the preferred embodiment where multiple steam passageways 28 and 30 are employed, the inner end or root portion of the bucket is provided with a steam inlet plenum 32 and a steam outlet plenum 34 in communication with passageways 28 and 30, respectively. Inlet plenum 32 has a bore 36 defining a steam inlet opening through the inner end of the base of bucket 14 for receiving steam from the supply passage 20. Outlet plenum 34 has a bore 38 defining a steam outlet similarly opening through the inner end of bucket 14 in communication with return passage 24 for flowing steam from the bucket into passage 24. Plugs 40 and 42 close the outer ends of plenums 32 and 34, respectively, while plugs 44 and 46 close the inner ends of the bucket steam passageways 28 and 30, respectively. The plugs 40, 42, 44 and 46 may be removed as desired for cleaning and inspection purposes.

According to the present invention, there is provided a steam transfer arrangement which includes a pair of compression seals 50 and 52 for disposition at axially spaced positions in recesses 54 and 56 in the bottom of the dovetail slot 18 of rotor wheel 12. Seals 50 and 52 comprise sleeves which are elastically deformable in a radial direction to enable assembly and disassembly of the buckets and turbine wheel and assure positive contact between their respective sealing surfaces. Each seal 50 and 52 comprises a sleeve having an annular corrugation such that the sleeve is compressible in a radial direction. Additionally, the diameters of the recesses 54 and 56 are larger than the diameter of the sleeves 50 and 52 such that the sleeves may be displaced in an axial direction, i.e., parallel to the axis of the rotation of the rotor wheel. The radially outer end of each sleeve is apertured and defines an annular, preferably spherical, surface for sealing engagement against an annular, preferably complementary shaped, surface formed about the inlet 36 or outlet 38, as applicable. The inner ends of the sleeves are apertured and sealingly seat on inner flanges of the recesses as illustrated in FIG. 2.

When the bucket is inserted into the dovetail slot by sliding it axially, the base of the bucket contacts the protruding annular spherical seal surface of the seal and depresses the seal into its corresponding recess. Once the inlet and outlet 36 and 38, respectively, with their annular spherical seats register with the annular spherical sealing surfaces of the sleeves 50 and 52, respectively, the bias of the compressed seals forces the spherical sealing surfaces of the seals into sealing engagement with the seats about the inlet and outlet, respectively. Note that the sealing sleeves 50 and 52 may move axially upon insertion of the bucket into the wheel, thus allowing the sleeves to be positioned directly under the spherical seats of the bucket for proper sealing. This accounts for possible misalignment of bucket and wheel dovetail transfer holes and affords self-alignment of the sealing surfaces and seats.

Once assembled, it will be appreciated that cooling steam may be provided via passage 20 and cavity 22 into the seal 50 and radially outwardly through the aperture of the seal into inlet 36 to plenum 32. Steam from plenum 32 flows through cooling passageways 28 for return by way of passageways 30 to outlet plenum 34. The returning steam then passes through the outlet 38, the sleeve 52, cavity 26 and into the return passage 24. It will be appreciated that inspection of the proper positioning of the compression seals can be achieved by removing the plugs 40 and 42, which also provide access to the internal steam distribution system for purposes of cleaning, inspection or modification, as required.

Figure 4:
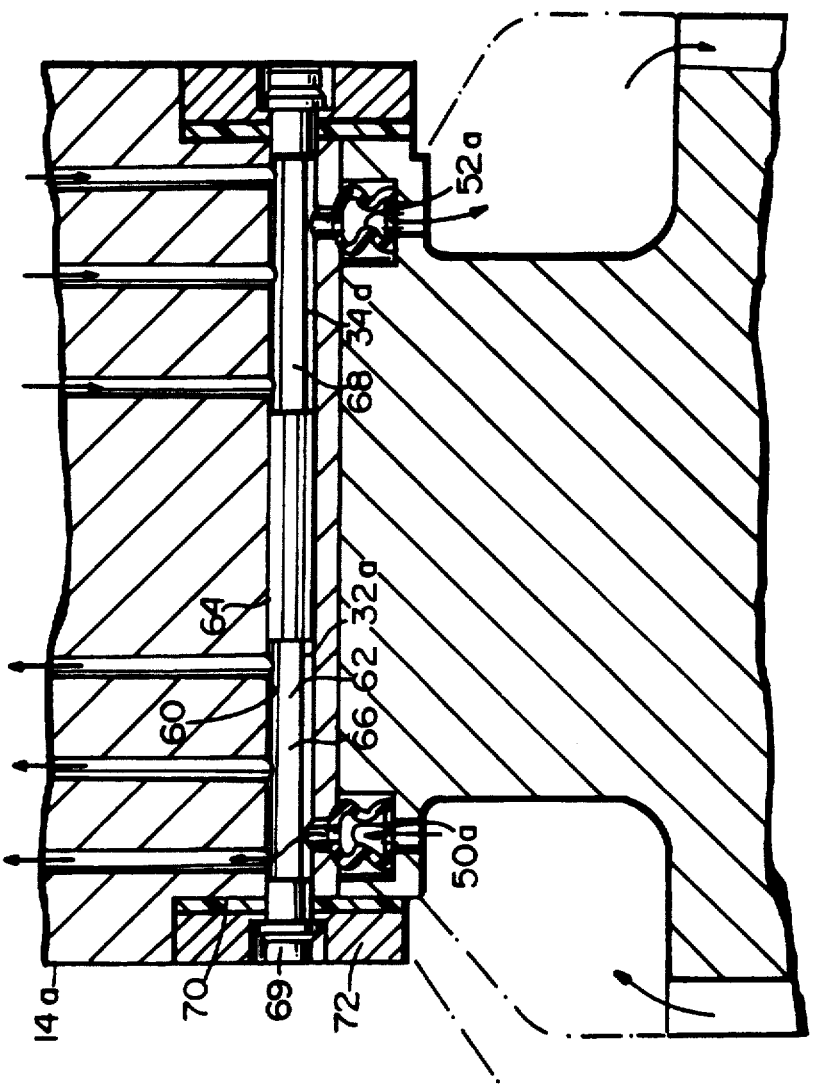
FIG. 4 is a fragmentary cross-sectional view thereof taken generally about one line 4—4 in FIG. 3.
Figure 3:
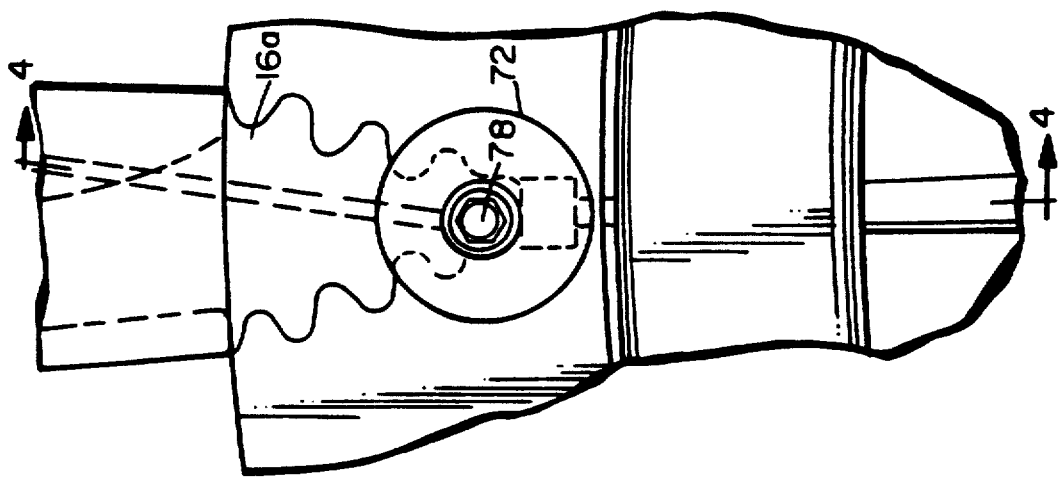
FIG. 3 is a view similar to FIG. 1 illustrating a steam transfer arrangement according to a further embodiment of the present invention.

Referring now to the embodiment of FIG. 4 hereof, wherein like reference numerals are applied to like parts as in the previous embodiment, followed by the suffix "a", there is provided a different plenum arrangement in the root 16a of the bucket 14a. In this form, a bore 60 is formed through the bucket root 16a between its opposite sides. A bolt 62 is passed axially through the bore 60. Bolt 62 includes a central diametrically enlarged section 64, with radially reduced opposite end sections 66 and 68 defining annular inlet and outlet plenums 32a and 34a with the walls of the bore 60. The ends of the bolt 62 are externally threaded to receive end nuts 69. The nut-and-bolt arrangement is such as to secure a gasket 70 and a cover plate 72 against each of the opposite sides of the root of the bucket and the wheel slot to prevent leakage through the seating of the sleeves 50a and 52a. Sealing is accomplished by pre-loading the sealing bolt to a predetermined value. The nut-and-bolt arrangement also provides additional locking for the bucket-to-wheel connection. In this form of steam transfer arrangement of the present invention, the sealing and locking arrangement provides a redundant and independent sealing feature, as well as enables the buckets to be locked in place independently. This feature also enables inspection and cleaning of the internal bucket plenum from the outside.

Figure 7:
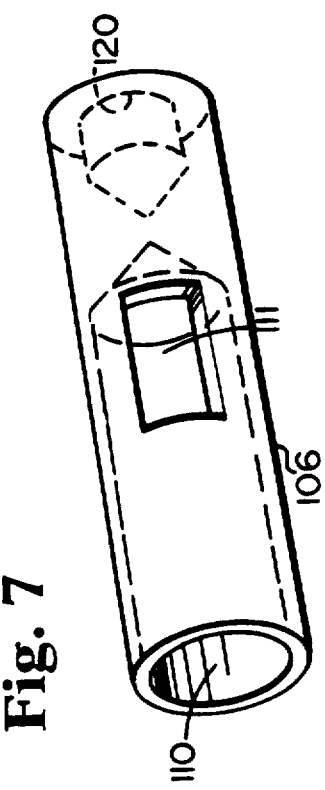
FIG. 7 is an enlarged perspective view of a steam transfer sleeve for use in the embodiment hereof illustrated in FIGS. 5 and 6.
Figure 6:
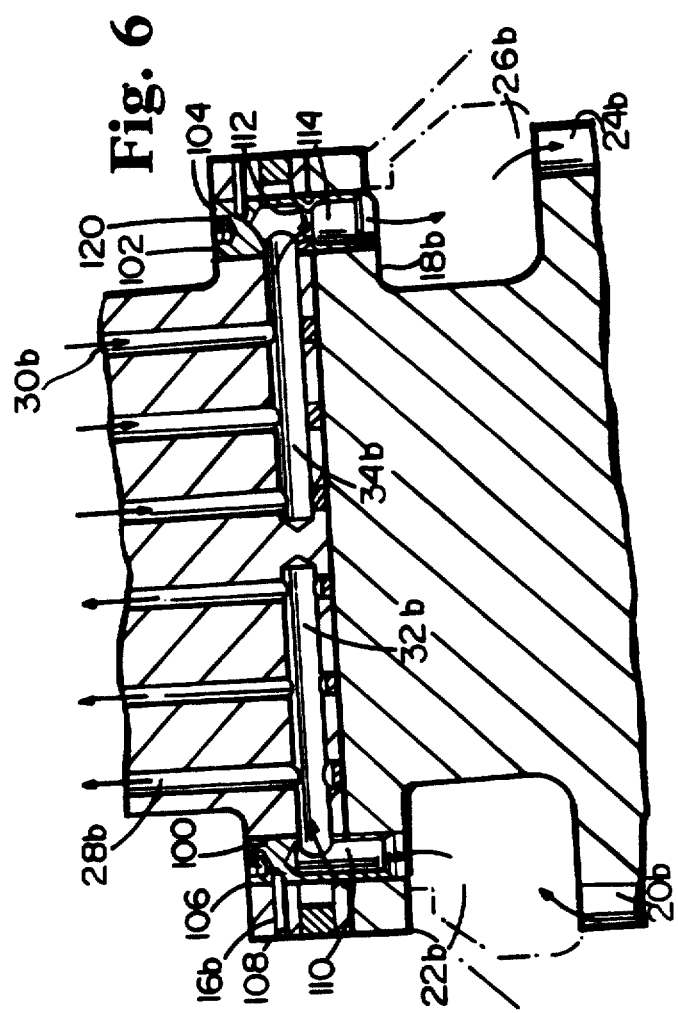
FIG. 6 is a fragmentary cross-sectional view thereof taken generally about on line 6—6 in FIG. 5.
Figure 5:
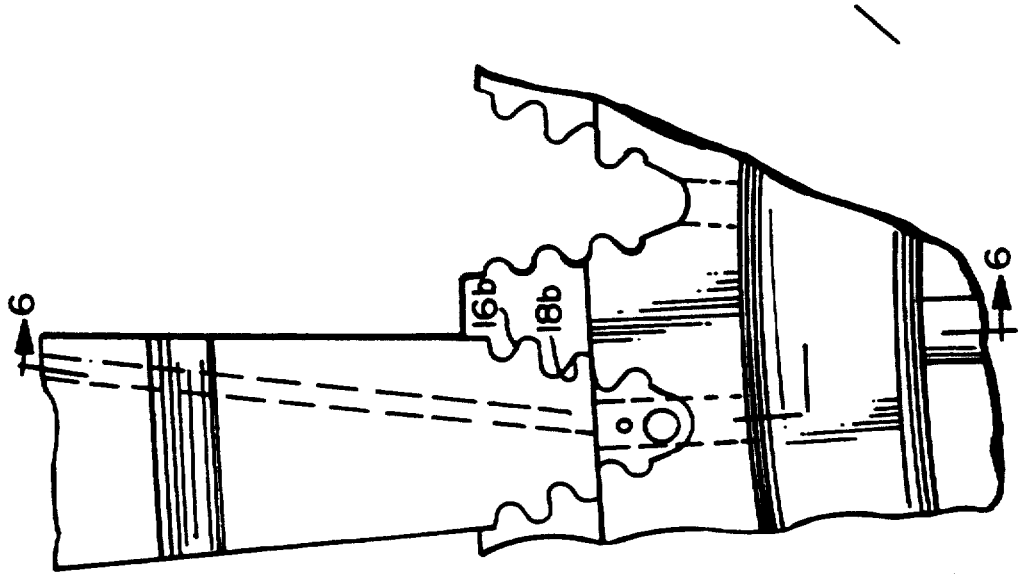
FIG. 5 is a view similar to FIG. 1 illustrating a still further embodiment of the present invention.

Referring now to the embodiment hereof illustrated in FIGS. 5-7, wherein like reference numerals are applied to like parts as in the prior embodiments, followed by the suffix "b", there is illustrated extensions of the bucket dovetail 16b and the wheel slot 18b in an axial outward direction. In this form, there is provided radially drilled holes 100 and 102, respectively, in the wheel and bucket dovetails, which receive solid transfer sleeves 106 and 104, respectively. The sleeves are press-fitted into the holes 100 and 102 after the bucket has been inserted into the wheel slot. The holes 100 and 102 overlie the cavities 22b and 26b forming part of the steam inlet passage 20b and steam return passage 24b. When the bucket and wheel are properly aligned and the sleeves 104 and 106 inserted, locking pins 108 are employed to lock the sleeves 104 and 106 in place.

As illustrated, the axially outer ends of the plenums 32b and 34b open through the holes 100 and 102, respectively. Sleeve 106 has a blind axially extending passage 110 in communication with cavity 22b. Hole 100 also lies in communication with plenum 32b through a side aperture 111. Consequently, sleeve 106 is rigid, provides axial locking of the bucket and wheel to one another and affords communication between the steam inlet passage 20b and the steam cooling passageways 28b. The steam exit sleeve 104 is similarly shaped but has a built-in flexibility, for example, afforded by a corrugation 112, to enable sleeve 104 to flex and thereby enable the sleeve to accommodate the bucket's axial thermal expansion relative to the fixed sleeve 106. More particularly, the exit sleeve 104 is provided with a flexible corrugated shape 112 at the interface point between the bucket and wheel dovetail designed to accept differential motion between those parts.

It will be appreciated that return steam flows from the bucket passageways 30b and into the plenum 34b and interior passage 114 of the exit sleeve 104 for return via the steam return passage 24b. Each sleeve 104 and 106 is provided with female threads 120 adjacent its radially outer surface to enable removal of the sleeve for inspection of the steam transfer point, cleaning of the interior of the steam flow passages and to enable modification in orifice flow areas to adjust turbine bucket cooling effectiveness to optimum levels. Additionally, the sleeves are formed of a material with thermal expansion characteristics higher than the expansion characteristics of the bucket, enabling increased sealing pressures at the surfaces.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. Steam transfer apparatus comprising:
   a turbine wheel having a rotary axis, a slot, a steam supply passage and a steam return passage opening into said slot;
   a turbine bucket having a base engaged in said slot and extending generally radially of said wheel;
   a steam inlet carried by said turbine bucket base for receiving steam from the turbine wheel steam supply passage, a steam passageway in communication with said steam inlet and extending along said bucket for steam cooling the bucket, and a steam outlet carried by said turbine bucket base in communication with said passageway in said bucket for flowing steam from said bucket to said turbine wheel steam return passage;
   a pair of seals between said steam supply passage and said steam inlet and said steam return passage and said outlet, respectively, at least one of said seals including a sleeve carried by one of said wheel and said bucket and having a sealing surface movable in a generally radial direction for sealing engagement with a seat carried by the other of said wheel and said bucket; and
   means for biasing said sealing surface for movement in the generally radial direction into sealing engagement with said seat.

2. Apparatus according to claim 1 including means carried by said one of said wheel and said bucket enabling said sealing surface for movement in a direction generally normal to said radial direction and generally parallel to the axis of said wheel.

3. Apparatus according to claim 1 wherein said sealing surface and said seat comprise generally annular spherical surface portions.

4. Apparatus according to claim 1 wherein said turbine bucket and said wheel are slidable axially relative to one another into a finally secured position, the sealing surface and said seat of said one seal being out of alignment one with the other during relative axial movement of said bucket and said wheel, said sealing surface being movable generally radially in one direction against said bias in response to said relative axial movement of said bucket and said wheel toward said finally secured position and in an opposite radial direction in response to axial movement in said bucket and wheel into said finally secured position aligning said sealing surface and said seat with one another.

5. Apparatus according to claim 1 wherein said bucket includes a steam inlet plenum and a steam outlet plenum, said inlet lying in communication with said steam inlet plenum and said outlet lying in communication with said steam outlet plenum, a plurality of supply passages in said bucket in communication with said inlet plenum and extending generally radially outwardly along said bucket and a plurality of steam outlet passages in said bucket in communication with said steam outlet plenum and extending generally radially inwardly along said bucket.

6. Apparatus according to claim 5 including means for selectively opening and closing said plenums at locations along the external surfaces of said bucket.

7. Apparatus according to claim 5 wherein said plenums are axially aligned with one another and a bolt extends through said plenums defining respective annular volumes in said plenums in communication with said inlet and outlet, respectively.

8. Apparatus according to claim 7 wherein said bucket includes a borehole extending between opposite sides of said bucket, a bolt extending through said borehole and between opposite sides of said bucket, said bolt having a diametrically enlarged central section opposite ends of which define interior ends of said plenums and means cooperable between said bolt and said bucket to secure said bolt in said borehole.

9. Apparatus according to claim 8 including an end gasket at each of the opposite ends of said borehole and cooperable with said securing means to seal said bucket and said wheel one to the other.

10. Steam transfer apparatus comprising:
    a turbine wheel having a rotary axis, a slot, and a steam supply passage and a steam return passage opening into said slot;
    a turbine bucket having a base engaged in said slot and extending generally radially of said wheel;
    a steam inlet carried by said turbine bucket base for receiving steam from the turbine wheel steam supply passage, a steam passageway in communication with said steam inlet and extending along said bucket for steam cooling the bucket and a steam outlet carried by said turbine bucket base in communication with said passageway in said bucket for cooling said bucket for flowing steam from said bucket to said turbine wheel steam return passage;
    a pair of sleeves between said steam supply passage and said inlet and said steam return passage and said outlet, respectively, at least one of said sleeves extending across an interface between said bucket base and said wheel slot, said one sleeve having an internal passage in communication with one of (i) said bucket inlet and said steam supply passage and (ii) said bucket outlet and said steam return passage.

11. Apparatus according to claim 10 wherein said one sleeve comprises a rigid sleeve locking said turbine bucket and said turbine wheel one to the other.

12. Apparatus according to claim 10 wherein said one sleeve is flexible to enable relative movement between said turbine bucket base and said turbine wheel.

13. Steam transfer apparatus comprising:
    a turbine wheel having a rotary axis, a slot, and a steam supply passage and a steam return passage opening into said slot;
    a turbine bucket having a base engaged in said slot and extending generally radially of said wheel;
    a steam inlet carried by said turbine bucket base for receiving steam from the turbine wheel steam supply passage, a steam passageway in communication with said steam inlet and extending along said bucket for steam cooling the bucket and a steam outlet carried by said turbine bucket base in communication with said passageway in said bucket for cooling said bucket for flowing steam from said bucket to said turbine wheel steam return passage;
    a pair of sleeves between said steam supply passage and said inlet and said steam return passage and said outlet, respectively, at least one of said sleeves extending across an interface between said bucket base and said wheel slot, said one sleeve having an internal passage in communication with one of (i) said bucket inlet and said steam supply passage and (ii) said bucket outlet and said steam return passage, said internal passage of said one sleeve including a passage extending axially of said sleeve in communication with said inlet passage and an aperture in said one sleeve in communication with said axially extending passage and opening radially of said sleeve.

14. Steam transfer apparatus comprising:
a turbine wheel having a rotary axis, a slot, and a steam supply passage and a steam return passage opening into said slot;
a turbine bucket having a base engaged in said slot and extending generally radially of said wheel;
a steam inlet carried by said turbine bucket base for receiving steam from the turbine wheel steam supply passage, a steam passageway in communication with said steam inlet and extending along said bucket for steam cooling the bucket and a steam outlet carried by said turbine bucket base in communication with said passageway in said bucket for cooling said bucket for flowing steam from said bucket to said turbine wheel steam return passage;
a pair of sleeves between said steam supply passage and said inlet and said steam return passage and said outlet, respectively, at least one of said sleeves extending across an interface between said bucket base and said wheel slot, said one sleeve having an internal passage in communication with one of (i) said bucket inlet and said steam supply passage and (ii) said bucket outlet and said steam return passage, said one sleeve comprising a rigid sleeve locking said turbine bucket and said turbine wheel one to the other, the internal passage of said one sleeve including a passage extending axially of said sleeve in communication with said inlet passage and an aperture in said sleeve in communication with said axially extending passage and opening radially of said sleeve into said inlet, another of said pair of sleeves being flexible to enable relative movement between said turbine bucket base and said turbine wheel.

15. Steam transfer apparatus comprising:
a turbine wheel having a rotary axis, a slot, a steam supply passage and a steam return passage opening into said slot;
a turbine bucket having a base engaged in said slot and extending generally radially of said wheel, said turbine bucket and said wheel being slidable axially relative to one another into a finally secured position;
a steam inlet carried by said turbine bucket base for receiving steam from the turbine wheel steam supply passage, a steam passageway in communication with said steam inlet and extending along said bucket for steam cooling the bucket, and a steam outlet carried by said turbine bucket base in communication with said passageway in said bucket for flowing steam from said bucket to said turbine wheel steam return passage;
a pair of seals between said steam supply passage and said steam inlet and said steam return passage and said outlet, respectively, at least one of said seals being carried by one of said wheel and said bucket and having a sealing surface movable into sealing engagement with a seat carried by the other of said wheel and said bucket;
means for biasing said sealing surface for movement into sealing engagement with said seat;
the sealing surface and said seat of said one seal being out of alignment one with the other during relative axial movement of said bucket and said wheel, said sealing surface being movable in one direction against said bias in response to said relative axial movement of said bucket and said wheel toward said finally secured position and in an opposite direction in response to axial movement in said bucket and wheel into said finally secured position aligning said sealing surface and said seat with one another.

16. Apparatus according to claim 15 wherein said bucket includes a steam inlet plenum and a steam outlet plenum, said inlet lying in communication with said steam inlet plenum and said outlet lying in communication with said steam outlet plenum, a plurality of supply passages in said bucket in communication with said inlet plenum and extending generally radially outwardly along said bucket and a plurality of steam outlet passages in said bucket in communication with said steam outlet plenum and extending generally radially inwardly along said bucket.

* * * * *